Patented Nov. 4, 1947

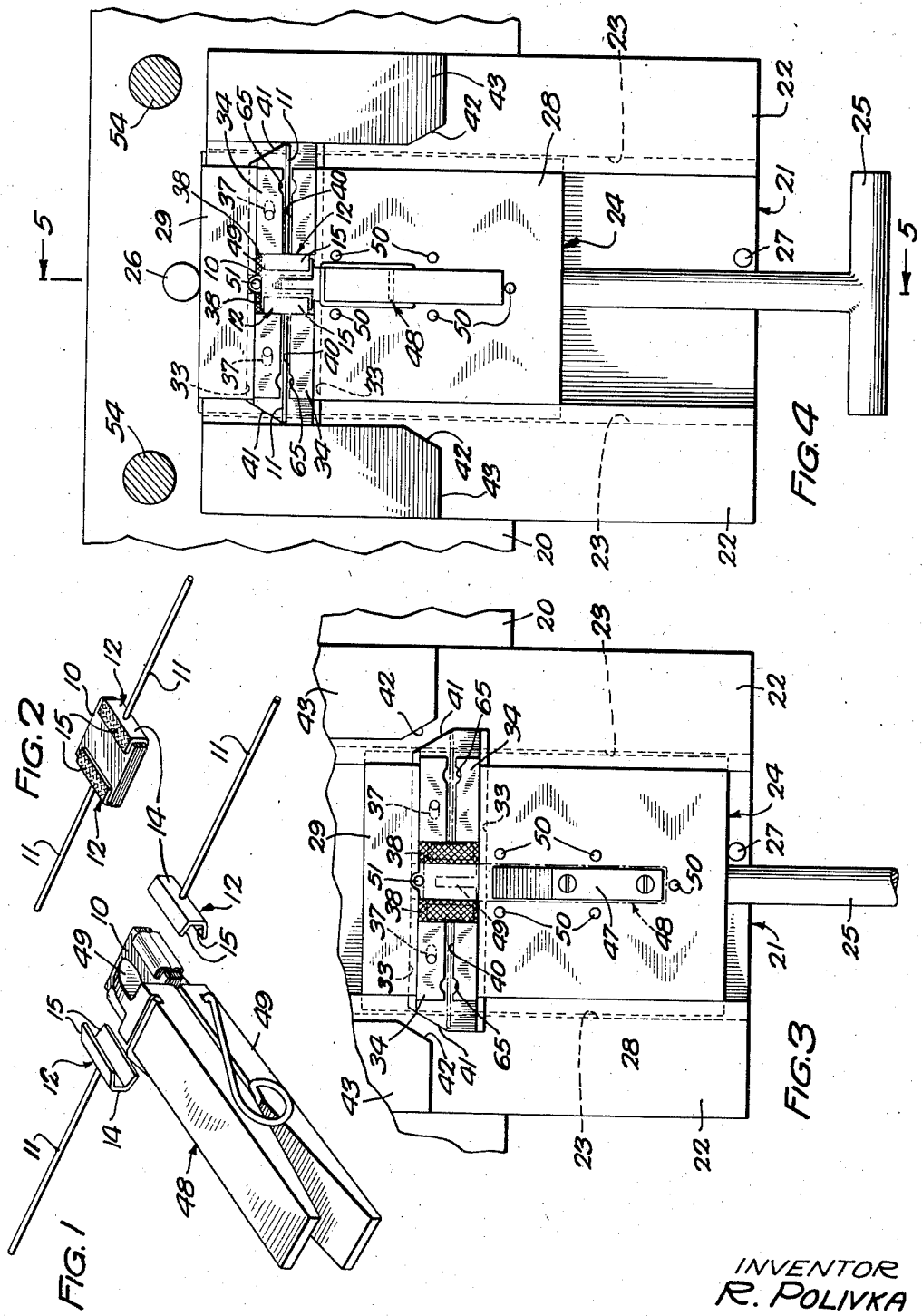
Nov. 4, 1947. R. POLIVKA 2,430,365
APPARATUS FOR ASSEMBLING ARTICLES
Filed Aug. 10, 1943 2 Sheets-Sheet 1
INVENTOR
R. POLIVKA
BY Harry R. Duff
ATTORNEY

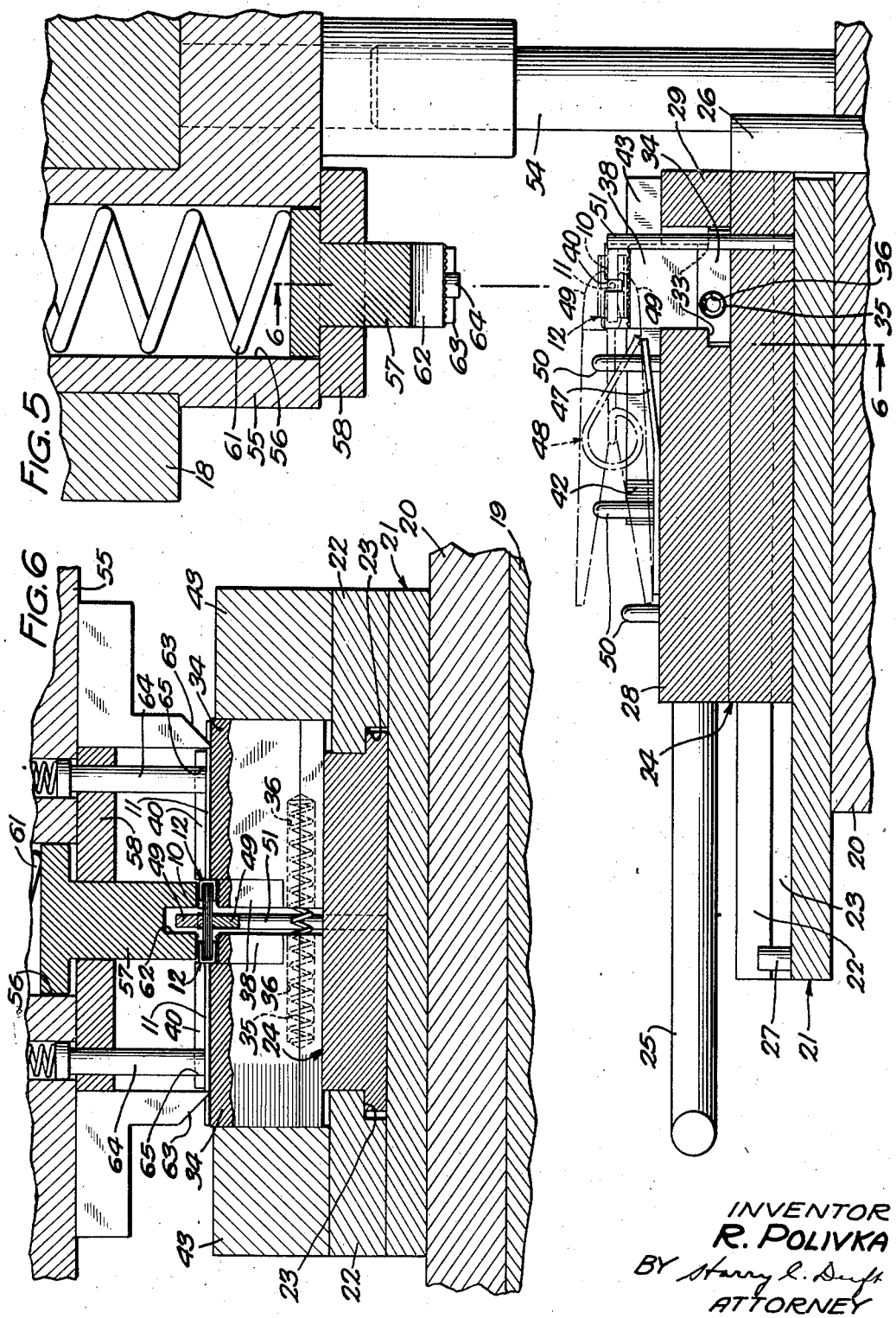

2,430,365

UNITED STATES PATENT OFFICE 2,430,365

APPARATUS FOR ASSEMBLING ARTICLES

Rudolph Polivka, Berwyn, Ill., assignor to Western Electric Company, Incorporated, New York, N. Y., a corporation of New York Application August 10, 1943, Serial No. 498,037

5 Claims. (Cl. 153—1)

This invention relates to apparatus for assembling articles and more particularly to an apparatus for attaching combined terminals and end clamping members to condenser stacks.

The present invention is especially applicable to the attaching of combined metallic terminal supporting and stack clamping members to condenser stacks. Such condenser stacks, in some instances, may comprise thin laminae of dielectric material of small area, such as mica sheets each having a metal film such as silver, on each side thereof, continuous strips of metal foil folded into flat loops entering between adjacent laminae to make electrical contact with the metal film on the laminae and folded over opposite edges of the laminae, and combined metallic terminal supporting and clamping members embracing the folded foils at opposite ends of the stacks and clinched thereon. This type of condenser stack presents considerable difficulty in handling while attaching the terminal supporting and clamping members, due to its small size and delicate nature.

An object of the present invention is to provide a simple and practicable apparatus for simultaneously attaching combined terminals and end clamping members to condenser stacks, rapidly, accurately and securely and in unison therewith cutting the terminals to predetermined accurate lengths.

In accordance with the above object, the present invention, in one embodiment thereof, comprises a sliding die block having means for accurately positioning and supporting a clothes-pin type of clamp carrying between the jaws thereof a condenser stack, the die block having transversely movable jaws with recessed upper faces and depressed anvils at their inner ends for receiving and positioning combined terminals and clamping members. Upon sliding the die block inwardly to clamping position, cam faces on the transverse jaws and cooperating stationary cam faces move the jaws and thereby the terminals and clamping members in opposite directions into accurate position relative to the condenser stack held in the clamp, the clamping members embracing the opposite ends of the stack. A reciprocable forked punch and shearing blades movable therewith, upon moving downwardly, press and clinch the clamping members to the ends of the stack while still held in the clamp, the movement of the blades in cooperation with shearing edges on the transversely movable jaws cutting the terminals to predetermined lengths.

Other objects and advantages of this invention will more fully appear from the following detailed description, taken in conjunction with the accompanying drawings, in which Fig. 1 is a perspective view illustrating a clothes-pin type of clamp for holding the condenser stack while clinching the combined terminal and clamping members to opposite ends of the stack by means of an apparatus embodying the features of the invention, the terminal and clamping members being shown in positions thereof before embracing the ends of the stack;

Fig. 2 is a perspective view of the assembled condenser stack upon removal from the attaching apparatus;

Fig. 3 is a fragmentary plan view of the lower portion of an apparatus situated below punch and shearing blades thereof, showing the slidable die block in its retracted position;

Fig. 4 is a view similar to Fig. 3, showing the die block with the clothes-pin type clamp holding a condenser stack in an advanced clamping position and the terminal and clamping members embracing opposite ends of the stack ready for the clinching operation;

Fig. 5 is a fragmentary vertical central section through the apparatus, on an enlarged scale, taken on the line 5—5 of Fig. 4; and Fig. 6 is a fragmentary vertical section through the apparatus taken on the line 6—6 of Fig. 5 showing the clinching and severing operations completed.

Although not limited thereto, an assembling and attaching apparatus embodying the features of the invention may be employed to advantage for accurately positioning and attaching together several parts of an electrical condenser of small dimensions (Figs. 1 and 2). Such condensers, as above described, may comprise a condenser stack 10 and oppositely arranged combined terminals 11 and U-shaped clamping members 12, the terminals 11 consisting of wires welded to a web portion 14 of the member 12. Initially, arms 15 of the members 12 are flared outwardly to facilitate the positioning thereof in embracing relation with opposite ends of the stack 10 preparatory to the clinching of the arms 15 thereto.

As illustrated in the drawings in detail, the apparatus, referring to Figs. 3, 4, 5 and 6, is used with a punch press of a usual type. Since it is not essential to a complete understanding of the invention, the punch press has not been illustrated, except those parts directly concerned with this invention, which consist of the following: A vertical reciprocable platen 18 (Fig. 5) and a stationary bed 19 (Fig. 6). Fixed to the upper face of the press bed 19 is a bolster plate 20, upon which is secured a die block 21, to which are fixed opposite plates 22 formed with slideways 23, upon which is mounted a carriage or slide 24 movable by a handle 25. The slideways 23 are centered with respect to the platen 18 and are adapted to permit the carriage 24 to be moved from its normal retracted position (Fig. 3) to an operated or advanced position (Figs. 4 and 5) under the platen 18, a vertical abutment or stop pin 26 secured in the bolster plate 20 and in the path of the carriage limiting the movement of the carriage at its advanced position and a similar pin 27 secured to the die block 21 limits the movement of the carriage at its retracted position.

Upon the upper face of the carriage 24 are secured a pair of spaced plates 28 and 29, having laterally extending slideways 33 formed in their inner opposite vertical faces between which, and upon the upper face of the carriage 24, are slidable in opposite directions a pair of spaced carriers 34 normally held retracted, as shown in Fig. 3, by a compression spring 35 (Figs. 5 and 6) entered at opposite ends in depressions 36 formed in opposite inner faces of the carriers. A pin and slot connection, indicated at 37, between each of the carriers 34 and the carriage 24 limits the movements of the carrier in either direction. Secured to the opposite inner faces of the carriers 34 above the springs 35 are anvil blocks 38 having their upper faces knurled and arranged in a predetermined plane below the upper face of the carriers. The upper faces of the carriers 34 are formed with longitudinally extending central grooves 40, which extend from the inner end faces of the carriers to points slightly inside the outer end faces thereof. As clearly shown in Figs. 4 and 6, the carriers 34 each predeterminedly support and position a combined terminal 11 and clamping member 12, the clamping members resting on the anvils 38 and the terminals 11 in the grooves 40. Vertical inclined cam faces 41 (Figs. 3 and 4) are provided on the outer end faces of the carriers 34 which, upon movement of the carriage 24 to its advanced position, engage similar cam faces 42 formed on guide plates 43 attached to the stationary slideway plates 22, thus causing the carriers 34 to move the combined terminals 11 and clamping members 12 inwardly into predetermined spaced relation, as shown in Fig. 4. During the greater portion of the movement of the carriage 24 to its advanced position, the outer end faces of the carriers 34 ride upon the inner vertical faces of the guide plates 43.

For supporting and predeterminedly positioning the condenser stack 10 upon the carriage 24 for movement thereon into assembling relation with the clamping members 12, the following means is provided: Fixed to the upper face of the plate 28 of the carriage 24 intermediate its opposite longitudinal edges and adjacent its inner end is a leaf spring rest 47, upon which is mounted a clothes-pin type clamp 48, between spring-pressed jaws 49 of which is clamped a condenser stack 10 (Figs. 1, 4 and 5). In its normal position, the spring rest 47 supports the right end (Fig. 5) of the clamp 48 at such an elevation that the stack 10 held thereby is in a plane for freely receiving the embracing arms 15 of the clamping members 15 as they are advanced to assembling position in a manner to be described presently. The jaws 49 are relatively narrow at their stack-engaging ends, as clearly shown in Figs. 1 and 4, so that the upper and lower faces of the stack at opposite sides of the jaws are free to receive the arms 15 of the clamping members 12. A plurality of vertical guide pins 50 fixed to the carriage plate 28 adjacent opposite sides and the outer end of the spring rest 47 are effective to maintain the clamp 48 in lateral and longitudinal position on the spring rest. Also fixed to the carriage 24 is a vertical guide pin 51, which is engaged by the inner vertical edge of the condenser stack 10, which, in cooperation with the pin 50, engaging the outer end of the clamp 48, positions the stack 10 in a longitudinal direction.

The reciprocable platen 18, which receives motion from a suitable power source in a well-known manner, is guided in its movements on a plurality of rods 54 fixed to the bolster plate 20, one of the rods being shown in Fig. 5. Attached to and depending from the platen 15 is a punch supporting block 55 having a vertical bore 56 in which is fitted a yieldable punch 57 or anvil, which is retained in the bore by a plate 58 fixed to the block 55. A compression spring 61 of suitable strength, having its opposite ends engaging the punch 57, and an end wall (not shown) of the bore 55 normally maintain the punch in its lowered position in the bore (Fig. 5). The lower end of the punch 57 is forked, as indicated at 62, and the lower end faces of the furcations, which are knurled, engage the upper faces of the arms 15 of the clamping members 12 and the space between the furcations is sufficient in width and height to freely receive the inner end of the clamp 48 when the punch 57 is lowered to press or clinch the arms 15 of the clamping members 12 resting on the anvil blocks 38 to the opposite ends of the condenser stack 10. Attached to the block 55 are depending terminal shear blades or cutters 63 arranged to clip the terminals 11 at predetermined points outside the outer ends of the grooves 40 during the advance movement of the platen 18 and the punch 57, the cutting edges of the blades operating against the upper faces of the carriers 34. Also carried by the block 55 are depending yieldable pins or pads 64 arranged to engage and, by pressure thereon, hold the terminals 11 with the attached clamping members 12 in assembled relation with the condenser stack 10 before the terminal clipping and clinching operations are effected on the clamping members. Opposite walls of the grooves 40 are cut away, as indicated at 65, to permit the pins 64 to engage the terminals 11.

In the use of the apparatus above described, and while the carriage 24 and platen 18 are in their retracted positions (Figs. 3 and 5), a pair of combined terminals 11 and clamping members 12 are mounted on the retracted laterally reciprocable carriers 34 and the clothes-pin type clamp 48 holding a condenser stack 10 is placed on the spring rest 47. Thereafter, the operator slides the carriage 24 by means of the handle 25 to its advanced position against the stop 26 and carrying the condenser parts into predetermined alignment with the forked yieldable punch 57, shearing blades 63 and yieldable pins 64, depending from the press platen 18. As the carriage 24 is thus advanced, the cooperating cam faces 41 and 42 on the carriers 34 and guide plates 43 cause the carriers to move inwardly, thus moving the U-shaped clamping members 12 into predetermined embracing relation with the opposite ends of the condenser stack 10. The platen 18 is now caused to descend and the arrangement is such that the yieldable pins 64 first engage the terminals 11 to firmly hold the same and the attached clamping members 12 in position during the subsequent clipping of the terminals by the shear blades 63 and the pressing and clinching by the forked punch 57 of the embracing arms 15 of the clamping members 12 to the opposite ends of the condenser stack 10, still held in the clothes-pin type clamp (Fig. 6). Upon the platen ascending, the carriage 24 is retracted to the position shown in Fig. 3 against the stop pin 27 and the completed condenser assemblage removed from the apparatus by lifting the clamp 48 from the spring rest 47, the carriers returning to their normal outer positions by the action of the spring 35.

From the foregoing description, it will be apparent that a simple, efficient and practicable apparatus is provided for accurately, simultaneously and securely attaching opposed combined embracing clamps and terminals to ends of condenser stacks and in unison therewith shearing the terminals to predetermined accurate lengths.

It will be understood that the embodiment described is merely illustrative of the invention and one application thereof and that modifications can be made and it is capable of other applications.

What is claimed is:

1. In an apparatus for assembling and clinching U-shaped members to an article, a base, a longitudinally slidable article supporting carriage mounted on said base, an article holder, a plurality of spaced guide means projecting from said carriage for laterally and longitudinally locating said holder and the article supported thereon on the carriage, oppositely disposed anvils slidable transversely on said carriage, each of said anvils having a working surface for supporting one of the members and a guiding surface for positioning the member, means for guiding said anvils in their movement on said carriage, cam means for camming said anvils toward each other to carry the members into embracing relation with the article, and a reciprocatory punch cooperating with said anvils for clinching the members to the article.

2. In an apparatus for assembling and clinching U-shaped members to an article, a base, a longitudinally slidable article supporting carriage mounted on said base, an article holder, a plurality of spaced guide means projecting from said carriage for laterally and longitudinally locating said holder and the article supported thereon on the carriage, said means including a yieldable rest for said holder, oppositely disposed anvils slidable transversely on said carriage, each of said anvils having a working surface for supporting one of the members and a guiding surface for positioning the member, means for guiding said anvils in their movement on said carriage, cam means for camming said anvils toward each other to carry the members into embracing relation with the article, and a reciprocatory punch cooperating with said anvils for clinching the members to the article.

3. In an apparatus for assembling and clinching U-shaped members supporting elements to an article, a base, a longitudinally slidable article supporting carriage mounted on said base, an article holder, a plurality of spaced guide means projecting from said carriage for laterally and longitudinally accurately locating said holder and the article supported thereon on the carriage, oppositely disposed anvils slidable transversely on said carriage, each of said anvils having a depressed working surface for supporting one of the members and a guiding surface angularly disposed relative to the working surface for positioning the member, means for guiding said anvils in their movement on said carriage, each of said anvils having a slot for receiving the element supported by the member, cam means for camming said anvils toward each other to carry the members into embracing relation with the article, a reciprocatory punch cooperating with said anvils for clinching the members to the article, and means movable with said punch for cutting the elements to predetermined lengths.

4. In an apparatus for assembling and clinching U-shaped members supporting an element to an article to opposite portions of an article, a base, a carriage thereon, means for guiding said carriage to and from an operative position, a clothespin spring type article holder, a plurality of spaced guide means projecting from said carriage for laterally and longitudinally accurately locating said holder and the article supported thereon on the carriage, aligned stepped anvils slidable on said carriage for movement in opposite directions at an angle to the movement of said carriage for supporting and accurately locating the members thereon relative to the opposite portions of the article, means for guiding said anvils in their movements on said carriage, said anvils having slots for receiving the elements, the members being positioned in the steps thereof, a spring operating against opposite surfaces of the anvils for moving the same to their inoperative positions during a similar movement of said carriage, cooperating cam means on said base and anvils for moving the latter to their operative positions to carry the members into embracing relation with the opposite portions of the article during similar movement of said carriage, a reciprocatory yieldably mounted forked punch spanning said holder, cooperating with said anvils and solely engaging the members for clinching the same to the article, and means movable with said punch for cutting the elements to predetermined lengths.

5. In an apparatus for assembling and clinching U-shaped clamping members with attached wire terminals to opposite portions of condenser stacks, a base, a carriage thereon, means for guiding said carriage to and from an operative position, a clothespin spring type condenser stack holder, a plurality of spaced guide means projecting from said carriage for laterally and longitudinally locating said holder and the condenser stack supported thereon on the carriage, said means including a leaf spring rest for said holder, aligned stepped anvils slidable on said carriage for movement in opposite directions at an angle to the movement of said carriage for supporting and accurately locating the members thereon relative to the opposite portions of the condenser stack, means for guiding said anvils in their movements on said carriage, said anvils having slots for receiving the wire terminals, the members being positioned in the steps thereof, cooperating cam means on said base and anvils for moving the latter to their operative positions to carry the members into embracing relation with the opposite portions of the condenser stack during similar movement of said carriage, a reciprocatory forked punch spanning said holder, cooperating with said anvils and solely engaging the members for clinching the same to the condenser stack, and means movable with said punch for cutting the wire terminals to predetermined lengths.

RUDOLPH POLIVKA.

REFERENCES CITED

The following references are of record in the file of this patent:

UNITED STATES PATENTS

| Number | Name | Date |
| --- | --- | --- |
| 2,352,855 | Molnar | July 4, 1944 |
| 1,727,184 | Thompson | Sept. 3, 1929 |
| 1,713,696 | Goldhammer | May 21, 1929 |
| 2,255,510 | Martindell | Sept. 9, 1941 |